Nov. 17, 1925.

E. J. CONOVER 1,561,530

TELEGRAPH REPEATER CIRCUITS

Filed Nov. 1, 1923

INVENTOR
E. J. Conover
BY
ATTORNEY

Patented Nov. 17, 1925.

1,561,530

UNITED STATES PATENT OFFICE.

ELMER J. CONOVER, OF DECATUR, GEORGIA, ASSIGNOR TO AMERICAN TELEPHONE AND TELEGRAPH COMPANY, A CORPORATION OF NEW YORK.

TELEGRAPH REPEATER CIRCUITS.

Application filed November 1, 1923. Serial No. 672,169.

*To all whom it may concern:*

Be it known that I, ELMER J. CONOVER, residing at Decatur, in the county of Dekalb and State of Georgia, have invented certain Improvements in Telegraph Repeater Circuits, of which the following is a specification.

This invention relates to telegraph circuits, and more particularly to such circuits in which telegraph repeaters are employed for the transmission of signals between two line sections.

It is one of the features of the invention to provide telegraph circuits for repeater sets which apply battery to a line section of the same potential and polarity as the distant marking battery, instead of opening the line to send the space signal. With such circuits the leakage current through the relay at the opposite end of the line is reduced when the repeater is opened, thus affording more efficient transmission. Other and further features of the invention will appear more fully hereinafter.

Figure 1:
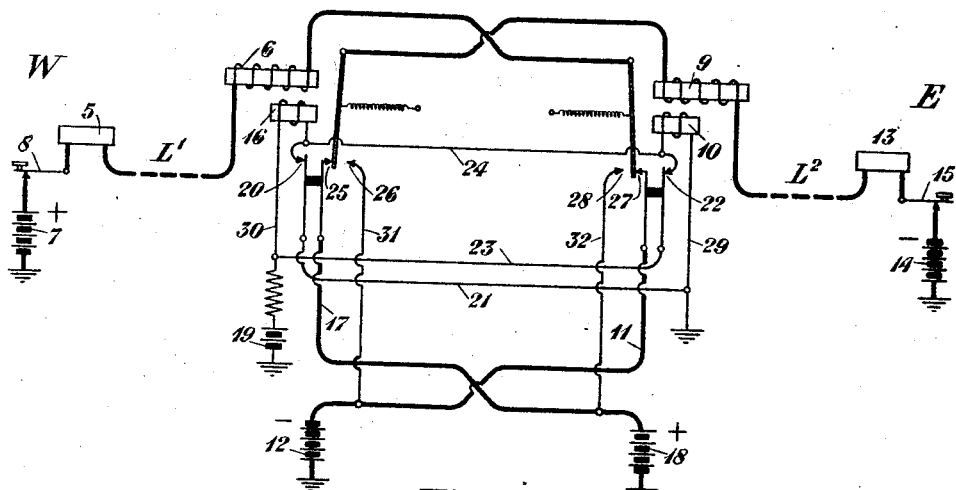
Figure 2:
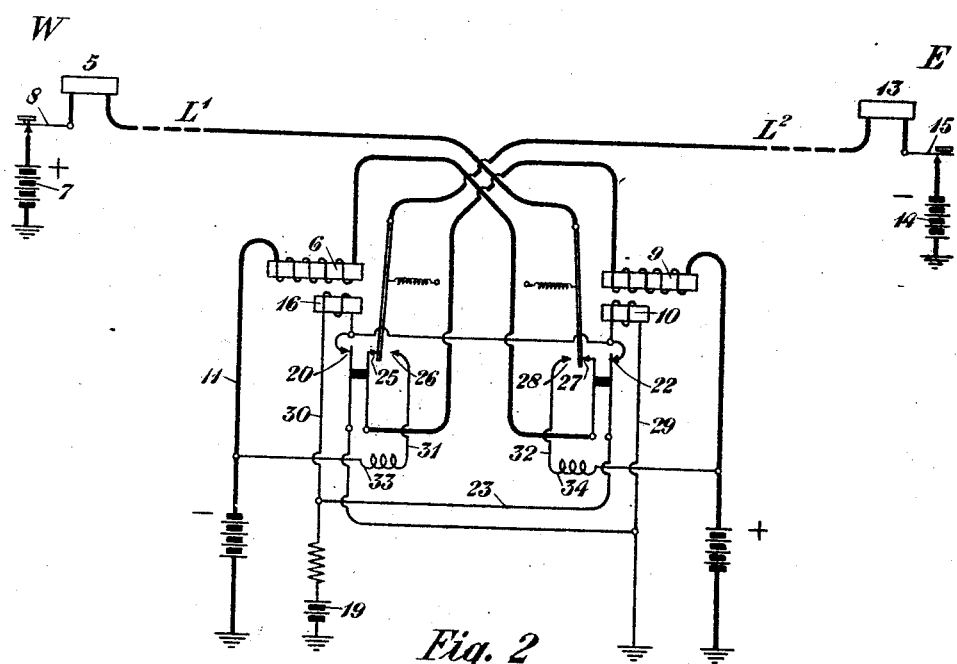

The invention may be more fully understood from the following detailed description, when considered in connection with the accompanying drawing, in which Figure 1 illustrates a circuit diagram of one embodiment thereof, and Fig. 2 illustrates a modification of Fig. 1.

In the drawing $L^1$ and $L^2$ represent the line sections which are interconnected by the repeater set of this invention. The line sections terminate at stations W and E, respectively, and these stations are each provided with the usual apparatus including a relay and key. The repeater set consists of the ordinary line relays and holding coils, and the armatures for these are provided with back contacts which are connected to battery of the same potential and polarity as the distant marking battery.

In the drawing, the lines $L^1$ and $L^2$ are shown in their normal or closed position. The relays 5 and 6 of line $L^1$ are energized by a circuit from positive battery 7, closed contact of key 8, windings of said relays, make contact 27 of armature for relays 9 and 10, conductor 11 to negative battery 12. Relays 9 and 13 of line $L^2$ are energized by a circuit through their windings from negative battery 14 and key 15, make contact 25 of armature for relays 6 and 16, conductor 17 to grounded positive battery 18. The holding coils 16 and 10 are deenergized under this condition by a short circuit extending from battery 19, conductor 23, contact 22, conductor 24, contact 20, conductor 21 to ground.

When one station desires to signal an opposite station, for instance, when station W signals station E, the key 8 of station W is opened, thereby breaking the circuit through relays 5 and 6, formerly described, thus deenergizing these relays. Upon the release of relay 6, its armature falls back, thus opening contacts 20 and 25 and closing back contact 26. The opening of contact 20 removes the shunt from holding coil 10, and current now flows over a circuit from battery 19, conductor 23, make contact 22, winding of coil 10, conductor 29 to ground, thereby energizing relay 10. The opening of front contact 25 and closing of back contact 26 disconnects positive battery 18 from the line section $L^2$, and connects negative battery 12 thereto over conductor 31 and back contact 26. The battery 12 is of the same polarity and potential as battery 14 at station E, and therefore a no-current condition exists on line $L^2$ at this time, and relays 9 and 13 release. The armature of relay 9, however, is not now released, due to the energization of holding coil 10 over the circuit previously outlined, which is of sufficient strength to hold said armature in an attracted position. The closure of key 8 at station W again restores the normal condition of the circuit as described above.

The circuit operation just outlined, for sending signaling impulses from station W to station E, is exactly the same in a reverse order when signaling impulses are sent from station E to station W.

The leakage effect as considered in connection with line section $L^2$, when station W is signaling station E, causes current to flow through relay 13 from negative battery 14 if the line is opened at the repeater, the amount of this current depending on the resistance of the leak. Relay 13 must be then adjusted to operate on a margin between the normal line current and the leakage current.

If, instead of opening line section $L^2$ at the repeater, a battery of the same potential and polarity as negative battery 14 is connected to the line, the leakage current through relay 13 for a given leak will be reduced since this is equivalent to connecting both ends of the line to the same battery thereby reducing the resistance between the battery and the leak and dividing the current through the two channels (the two ends of the line), and reducing the potential drop between the battery and the leak. Consequently, the current through relay 13 is reduced, or the operating margin for this relay is increased. What has been said concerning leakage in connection with line section L² applies as well to line section L¹, when station E is signaling station W.

In Fig. 1 the relays 6 and 9 are shown connected in series in their respective lines for the purpose of maintaining a constant terminal impedance when a line is connected to battery through either the front or back contact of the opposite relay. This is an important feature, especially when telegraph current is superposed on telephone wires.

Fig. 2 shows another arrangement of the repeater, in which the lines L¹ and L² are connected directly to the armatures of relays 9 and 6, respectively. Relays 9 and 6 are in series with the batteries connected to the front contacts 25 and 27, respectively, and coils 33 and 34, of the same impedance as relays 9 and 6, are in series with the batteries connected to the back contacts 26 and 28, respectively. This substitution of the impedance coils for the relays of Fig. 1 makes the terminal impedance through either the front or back contacts of the repeater a constant factor. The operation of the circuit of Fig. 2 will be similar to that outlined in connection with Fig. 1, and need not be further described.

While the arrangements of this invention have been illustrated as embodied in a certain specific form, it will be understood that it is not so limited, but may be embodied in many and widely varied arrangements without departing from the spirit of the invention as defined in the appended claims.

What is claimed is:

1. A telegraph repeater interconnecting two line sections, said repeater including a relay for each line section, an armature for each relay, battery of one polarity connected to the distant terminals of one of said line sections, the front contact of the armature of the relay associated with the other line section being connected to battery so poled to cause current to flow over said first line section in the same direction as the current flowing in the distant battery, and a battery of opposite polarity connected to the back contact of said armature so that when the armature rests upon said back contact a no-current condition will occur upon said first line section.

2. A telegraph repeater interconnecting two line sections, said repeater including a normally energized relay for each line section, an armature for each relay, said armature having a front contact connected to battery of one polarity and a back contact connected to battery of the opposite polarity, and terminals at each line section connected to battery of the same polarity and potential as the back contact of the relay armature at the opposite line section.

3. A telegraph repeater interconnecting two line sections, said repeater including a normally energized relay for each line section, an armature for each relay, said armature having a front contact connected to battery of one polarity and a back contact connected to battery of the opposite polarity, terminals at each line section connected to battery of the same polarity and potential as the back contact of the relay armature at the opposite line section, and means in circuit with each back contact for presenting constant terminal impedance when battery is reversed.

In testimony whereof, I have signed my name to this specification this 30th day of October, 1923.

ELMER J. CONOVER.